United States Patent
Qian

(10) Patent No.: US 12,518,581 B2
(45) Date of Patent: Jan. 6, 2026

(54) METHOD AND SYSTEM FOR MANAGING SMART DOOR LOCK BASED ON PLATFORM MANAGEMENT

(71) Applicant: U-tec Group Inc., Union City, CA (US)

(72) Inventor: Lingling Qian, Union City, CA (US)

(73) Assignee: U-Tec Group Inc., Union City, CA (US)

( * ) Notice: Subject to any disclaimer, the term of this patent is extended or adjusted under 35 U.S.C. 154(b) by 135 days.

(21) Appl. No.: 18/494,161

(22) Filed: Oct. 25, 2023

(65) Prior Publication Data

US 2025/0140044 A1     May 1, 2025

(51) Int. Cl.
*G07C 9/00*     (2020.01)
*G07C 9/37*     (2020.01)
*G07C 9/38*     (2020.01)

(52) U.S. Cl.
CPC ..... *G07C 9/00571* (2013.01); *G07C 9/00563* (2013.01); *G07C 9/37* (2020.01); *G07C 9/38* (2020.01)

(58) Field of Classification Search
CPC .. G07C 9/00571; G07C 9/00563; G07C 9/37; G07C 9/38; G07C 9/00309; G06Q 10/00
USPC ........................................................ 340/5.61
See application file for complete search history.

(56) References Cited

U.S. PATENT DOCUMENTS

| | | | | |
|---|---|---|---|---|
| 7,012,503 B2* | 3/2006 | Nielsen | ..................... | G07C 9/27 340/5.6 |
| 7,536,709 B2* | 5/2009 | Shitano | ..................... | H04L 63/06 709/229 |
| 8,723,641 B2* | 5/2014 | Sadighi | ..................... | G08C 17/02 340/5.2 |
| 10,142,843 B2* | 11/2018 | Conrad | .............. | G07C 9/00571 |
| 10,514,859 B2* | 12/2019 | Borlick | ................. | G06F 3/0683 |
| 11,190,936 B2* | 11/2021 | Bolotin | ................. | H04W 12/47 |
| 11,373,471 B2* | 6/2022 | Anderson | ................. | E06B 7/28 |
| 2009/0299777 A1* | 12/2009 | Silberman | .............. | G06Q 10/02 705/5 |
| 2013/0127593 A1* | 5/2013 | Kuenzi | .............. | G07C 9/00817 340/5.61 |
| 2014/0120905 A1* | 5/2014 | Kim | ........................ | H04W 4/80 455/426.1 |
| 2015/0170448 A1* | 6/2015 | Robfogel | ................. | G07C 9/20 340/5.61 |
| 2016/0014131 A1* | 1/2016 | Neafsey | .............. | H04W 12/082 713/171 |

(Continued)

*Primary Examiner* — Nam V Nguyen
(74) *Attorney, Agent, or Firm* — Heslin Rothenberg Farley and Mesiti P.C.; Victor A. Cardona, Esq.

(57) ABSTRACT

The present disclosure provides a method and system for managing a smart door lock based on platform management and relates to the field of smart door lock management. The method includes: entering user information using a client and binding the user information to a corresponding smart door lock, wherein the user information includes an identity (ID), a password, and a smart door lock card number; uploading an association relationship between the smart door lock and a user authority to a cloud server; storing the association relationship between the smart door lock and the user authority using the cloud server; and sending the association relationship between the smart door lock and the user authority to the smart door lock. The present disclosure improves the safety and convenience of the smart door lock.

4 Claims, 1 Drawing Sheet

(56) References Cited

U.S. PATENT DOCUMENTS

| | | | | |
|---|---|---|---|---|
| 2016/0036788 A1* | 2/2016 | Conrad | ................ | H04W 12/06 |
| | | | | 713/168 |
| 2023/0316160 A1* | 10/2023 | Yamaguchi | .......... | G06V 40/172 |
| | | | | 705/5 |
| 2025/0141747 A1* | 5/2025 | Zhu | .................... | H04L 41/0869 |

* cited by examiner

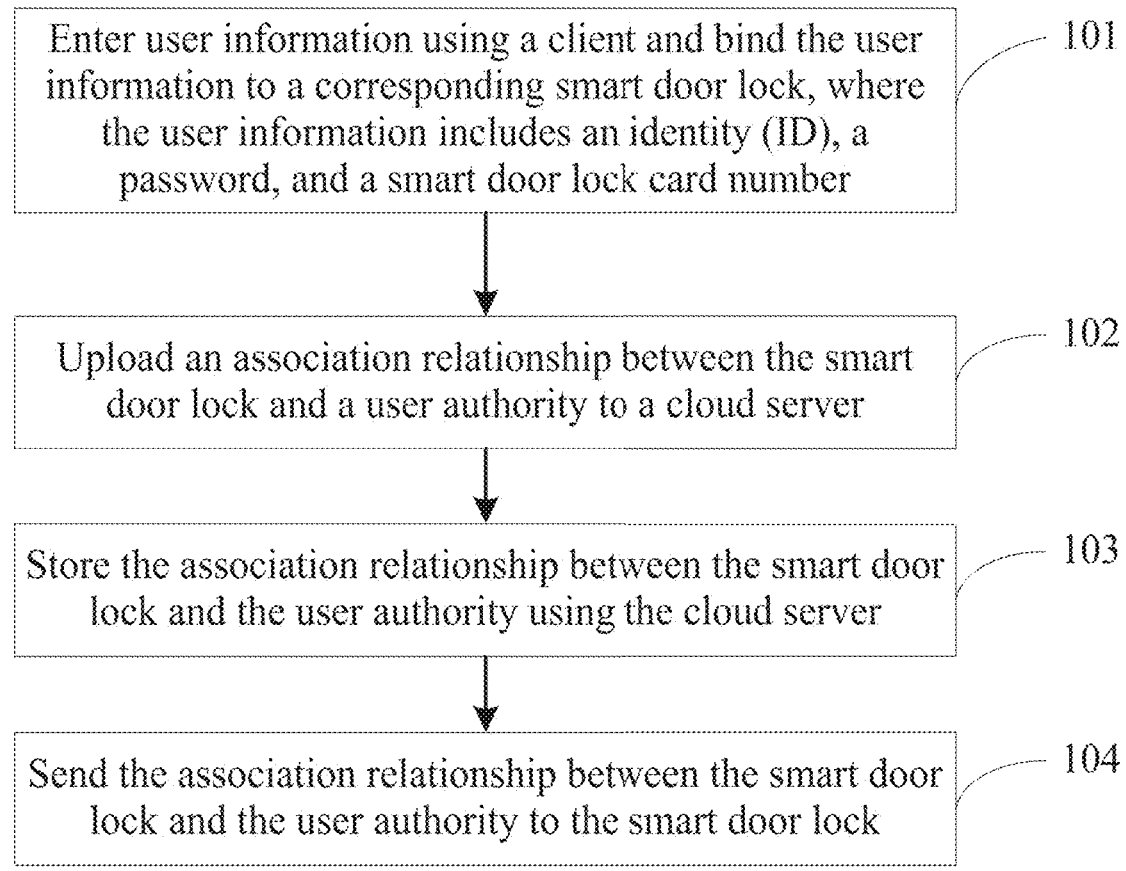

METHOD AND SYSTEM FOR MANAGING SMART DOOR LOCK BASED ON PLATFORM MANAGEMENT

TECHNICAL FIELD

The present disclosure relates to the field of smart door lock management, and in particular, to a method and system for managing a smart door lock based on platform management.

BACKGROUND

A traditional smart door lock typically acquires user information offline. When other users need to unlock the smart door lock, the owner of the smart door lock is required to be present at the site of the smart door lock or give a door lock password to other users so that information of other users can be recorded to unlock the smart door lock. This approach is poor in safety and convenience.

SUMMARY

An objective of the present disclosure is to provide a method and system for managing a smart door lock based on platform management to solve the problems of poor safety and poor convenience of the traditional smart door lock management approach.

To achieve the above objective, the present disclosure provides the following technical solutions.

A method for managing a smart door lock based on platform management includes:
  entering user information using a client and binding the user information to a corresponding smart door lock, where the user information includes an identity (ID), a password, and a smart door lock card number;
  uploading an association relationship between the smart door lock and a user authority to a cloud server;
  storing the association relationship between the smart door lock and the user authority using the cloud server; and
  sending the association relationship between the smart door lock and the user authority to the smart door lock.

Alternatively, before entering user information using a client and binding the user information to a corresponding smart door lock, the method may further include:
  taking user information firstly bound to the smart door lock as a super administrator.

Alternatively, after taking user information firstly bound to the smart door lock as a super administrator, the method may further include:
  configuring, by the super administrator, different user authorities and different user information for different users, where the user authority includes times of unlocking the smart door lock, a time of opening the smart door lock, and a duration that the smart door lock is opened.

Alternatively, the method may further include:
  querying, modifying, or deleting the user information using the super administrator, and updating an operation result into the cloud server.

Alternatively, the method may further include: collecting a human body biological feature of a user by the smart door lock offline, where the human body biological feature includes a fingerprint and a facial feature point.

A system for managing a smart door lock based on platform management includes:

a client configured to: enter user information and bind the user information to a corresponding smart door lock, where the user information includes an ID, a password, and a smart door lock card number; and
upload an association relationship between the smart door lock and a user authority to a cloud server; and
the cloud server configured to: store the association relationship between the smart door lock and the user authority; and
send the association relationship between the smart door lock and the user authority to the smart door lock.

Alternatively, the client is further configured to take user information firstly bound to the smart door lock as a super administrator.

Alternatively, the super administrator is configured to configure different user authorities and different user information for different users, where the user authority includes times of unlocking the smart door lock, a time of opening the smart door lock, and a duration that the smart door lock is opened.

According to the specific embodiments provided in the present disclosure, the present disclosure has the following technique effects: in the present disclosure, the user information is directly entered at the client, and the association relationship between the smart door lock and the user authority is sent to the smart door lock using the cloud server, and the corresponding user unlocks the smart door lock according to the association relationship between the smart door lock and the user authority. The whole process can be directly implemented at the client, and the user information does not need to be recorded offline. The safety and convenience of the smart door lock are improved to a large extent.

BRIEF DESCRIPTION OF THE DRAWINGS

In order to describe the technical solutions in the embodiments of the present disclosure or in the prior art more clearly, the accompanying drawings required for the embodiments are briefly described below.

FIG. 1 is a flowchart of a method for managing a smart door lock based on platform management provided in the present disclosure.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts shall fall within the protection scope of the present disclosure.

An objective of the present disclosure is to provide a method and system for managing a smart door lock based on platform management that improve the safety and convenience of the smart door lock.

In order to make the above objective, features, and advantages of the present disclosure clearer and more comprehensible, the present disclosure will be further described in detail below in combination with accompanying drawings and particular implementation modes.

Example 1

As shown in FIG. 1, the present disclosure provides a method for managing a smart door lock based on platform management, including the following steps.

Step 101: user information is entered using a client and the user information is bound to a corresponding smart door lock, where the user information includes an ID, a password, and a smart door lock card number.

In practical use, before step 101, the method further includes: take user information firstly bound to the smart door lock as a super administrator.

In practical use, different user authorities and different user information are configured by the super administrator for different users, where the user authority includes times of unlocking the smart door lock, a time of opening the smart door lock, and a duration that the smart door lock is opened.

Different users correspond to different user information. That is, different users can correspond to different passwords, and the super administrator can determine the user who unlocks the smart door lock according to the user information of unlocking the smart door lock, facilitating the management of the smart door lock.

The user information is queried, modified, or deleted using the super administrator, and an operation result is updated into the cloud server.

Step 102: an association relationship between the smart door lock and a user authority is updated to a cloud server.

Step 103: the association relationship between the smart door lock and the user authority is stored using the cloud server.

Step 104: the association relationship between the smart door lock and the user authority is sent to the smart door lock.

In practical use, the present disclosure further includes: collect a human body biological feature of a user by the smart door lock offline, where the human body biological feature includes a fingerprint and a facial feature point.

The present disclosure realizes convenient management and application of the smart door lock based on a cloud platform. Smart door locks are integrated using the cloud server and the Internet and managed on a unified management platform.

In the present disclosure, an identification authority and identification information required by each smart door lock are sent by the cloud server. That is, the association relationships between the smart door locks and the user authorities are managed in batch. The association relationship may be a management authority between one door lock and a plurality of users or a management authority between a user and a plurality of door locks.

In the present disclosure, a user can collect own user information through a client APP or an applet, and the user information is then uploaded to the cloud server through the client and sent to the corresponding smart door lock by the cloud server. Thus, when the user is present at the site of the smart door lock for relevant verification, the user can be authorized rapidly to enter a room.

In practical use, facial feature point image information, fingerprint information, or other personal confidential information of the user is collected by the smart door lock offline rather than by the client and the cloud server, thereby ensuring the information safety of the user.

Example 2

To perform the corresponding method of Example 1 so as to implement corresponding functions and technical effects, a system for managing a smart door lock based on platform management is provided below.

A system for managing a smart door lock based on platform management includes:

a client configured to: enter user information and bind the user information to a corresponding smart door lock, where the user information includes an ID, a password, and a smart door lock card number; and upload an association relationship between the smart door lock and a user authority to a cloud server; and the cloud server configured to: store the association relationship between the smart door lock and the user authority; and send the association relationship between the smart door lock and the user authority to the smart door lock.

In practical use, the client is further configured to take user information firstly bound to the smart door lock as a super administrator.

In practical use, the super administrator is configured to configure different user authorities and different user information for different users, where the user authority includes times of unlocking the smart door lock, a time of opening the smart door lock, and a duration that the smart door lock is opened.

The present disclosure realizes wide area management of a plurality of smart door locks through a set platform. More application scenarios can be expanded based on the system for managing a smart door lock, such as hotel door lock management industry and house rental industry.

At this point, the specific embodiments of the subject matter have been disclosed. Other embodiments fall within the scope of the appended claims. The system, apparatus, module, or unit elaborated in the foregoing embodiments may be specifically implemented by a computer chip or an entity, or implemented by a product having a particular function. One typical implementation device is the computer. Specifically, the computer may be, for example, a personal computer, a laptop computer, a cellular phone, a camera phone, a smartphone, a PDA, a media player, a navigation device, an E-mail device, a game console, a tablet computer, a wearable device or a combination thereof.

For ease of description, the foregoing apparatus is divided into various units based on functions for separate description. Certainly, functions of different units may be implemented in one or more pieces of software and/or hardware during implementation of the present disclosure. Those skilled in the art should understand that the embodiments of the present disclosure may be provided as a method, a system, or a computer program product. Therefore, the present application can take the form of an entire hardware embodiment, an entire software embodiment, or an embodiment combining software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments are described herein in a progressive manner. Each embodiment focuses on the difference from another embodiment, and the same and similar parts between the embodiments may refer to each other. Since the system disclosed in an embodiment corresponds to the method disclosed in an embodiment, the description is relatively simple, and for related contents, references can be made to the description of the method.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the description shall not be construed as limitations to the present disclosure.

What is claimed is:

1. A method for managing a smart door lock based on platform management, comprising:
   entering user information using a client and binding the user information to a corresponding smart door lock, wherein the user information comprises an identity (ID), a password, and a smart door lock card number;
   uploading an association relationship between the smart door lock and a user authority to a cloud server;
   storing the association relationship between the smart door lock and the user authority using the cloud server; and
   sending the association relationship between the smart door lock and the user authority to the smart door lock;
   wherein before entering the user information using the client and binding the user information to the corresponding smart door lock, the method further comprises:
   taking user information firstly bound to the smart door lock as a super administrator; and
   configuring, by the super administrator, different user authorities and different user information for different users, wherein the user authority comprises times of unlocking the smart door lock, a time of opening the smart door lock, and a duration that the smart door lock is opened.

2. The method for managing the smart door lock based on platform management according to claim 1, further comprising:
   querying, modifying, or deleting the user information using the super administrator, and updating an operation result into the cloud server.

3. The method for managing the smart door lock based on platform management according to claim 1, further comprising: collecting a human body biological feature of a user by the smart door lock offline, wherein the human body biological feature comprises a fingerprint and a facial feature point.

4. A system for managing a smart door lock based on platform management, comprising:
   a client configured to: enter user information and bind the user information to a corresponding smart door lock, wherein the user information comprises an ID, a password, and a smart door lock card number; and
   upload an association relationship between the smart door lock and a user authority to a cloud server; and
   the cloud server configured to: store the association relationship between the smart door lock and the user authority; and
   send the association relationship between the smart door lock and the user authority to the smart door lock;
   wherein the client is further configured to take user information firstly bound to the smart door lock as a super administrator;
   wherein the super administrator is configured to configure different user authorities and different user information for different users, wherein the user authority comprises times of unlocking the smart door lock, a time of opening the smart door lock, and a duration that the smart door lock is opened.

* * * * *